United States Patent [19]
Maher

[11] 4,253,970
[45] Mar. 3, 1981

[54] FLOCCULATION OF COALS WITH WATER-SOLUBLE STARCH XANTHATES

[75] Inventor: George G. Maher, Dunlap, Ill.

[73] Assignee: The United States of America as represented by the Secretary of Agriculture, Washington, D.C.

[21] Appl. No.: 80,733

[22] Filed: Oct. 1, 1979

[51] Int. Cl.$^3$ .............................................. C02F 1/56
[52] U.S. Cl. ................................................... 210/731
[58] Field of Search ........................ 210/53, 54, 51, 52

[56] References Cited

U.S. PATENT DOCUMENTS

| | | |
|---|---|---|
| 3,575,868 | 4/1971 | Galvin et al. |
| 3,717,574 | 2/1973 | Werneke ................................. 210/53 |
| 3,947,534 | 3/1976 | Swanson et al. ....................... 210/53 |
| 4,178,243 | 12/1979 | Messer ................................... 210/54 |

FOREIGN PATENT DOCUMENTS 1309473 3/1973 United Kingdom.

OTHER PUBLICATIONS

Baudet, et al., "Synthese et Caracterisation, etc.", Industrie Minerale Mineralurgie, 60(1): 19–35, (1978).

Primary Examiner—Thomas G. Wyse
Attorney, Agent, or Firm—M. Howard Silverstein; David G. McConnell; Curtis P. Ribando

[57] ABSTRACT

Powdered coals are rapidly flocculated from aqueous suspensions by the simple addition of water-soluble starch xanthate, thereby producing a readily recoverable sediment phase and a substantially clear aqueous phase.

6 Claims, No Drawings

FLOCCULATION OF COALS WITH WATER-SOLUBLE STARCH XANTHATES

BACKGROUND OF THE INVENTION

1. Field of the Invention

As a result of the pending energy shortage in the United States and other coal-producing countries, current emphasis is on rapid and inexpensive means for distributing the coal to storage and shipping centers, and also to the electric generating plants. A now widely practiced method is pipeline pumping of pulverized coal in aqueous slurry. An existent problem with this practice lies with the efficient recovery from the slurry of both the coal and an environmentally acceptable discharge water. After primary separation of the larger particles, a substantial proportion of the coal remains in the slurry as a colloidal suspension. Attempts to flocculate this residual colloidal coal have relied upon complicated and expensive chemical procedures.

2. Description of the Prior Art

In U.S. Pat. No. 3,717,574, Werneke flocculates coal by a process requiring the combination of pH adjustment to the slightly acid range and the addition of at least two water-soluble anionic polymers or copolymers. One of the polymers must be of low molecular weight and comprise acrylic acid linkages, and the other must be of high molecular weight and comprise vinyl acid linkages. Werneke further teaches that a water-soluble anionic starch acts as an auxiliary flocculant when combined with the low molecular weight polymer in his system. Similarly, in British Pat. No. 1,309,473, Jonason shows starch phosphate as a flocculant for coal washery tailings. While this patent acknowledges the desirability of a truly soluble starch derivative for use as a flocculating agent, the highest starch phosphate solubility obtained therein is 61%. Moreover, this degree of solubility is obtainable only by stringent conditions of preparation.

SUMMARY OF THE INVENTION

I have now unexpectedly found that when a water-soluble starch xanthate is added to a slurry comprising colloidal coal, it flocculates substantially all the suspended coal without the need for additional flocculants or pH adjustment. The result is a flocculated coal-enriched sediment phase and a coal-depleted aqueous phase which are readily separable from one another.

In accordance with this discovery, it is the primary objective of the invention to effectively and inexpensively recover nearly 100% of the coal from aqueous slurries thereof.

It is also an object of the invention to recover from aqueous coal slurries a coal-free effluent which is suitable for discharge to the environment.

It is a further object of the invention to effect the above-described recoveries by means of a simple flocculation process using a single flocculant which is easily prepared and is characterized by a high degree of solubility.

Other objects and advantages of this invention will become readily apparent from the ensuing description.

DETAILED DESCRIPTION OF THE INVENTION

For purposes of this invention the terms "coal slurry" and "coal suspension" are used interchangeably to refer to a pumpable dispersion of coal in water or other aqueous medium suitable for suspending the coal in a pumpable state. The terms "pulverized" and "powdered" are also used interchangeably in reference to coal particles ranging in size from colloidal to that which remains in aqueous suspension under normal conditions. Generally, the slurries treatable by the disclosed process will comprise coal which remains in suspension after primary recovery. Typically this will amount to about 2–5% (w/v) and may even be as high as about 10%. It is envisioned that all types of coal will be responsive to secondary recovery by the instant flocculation process. The lignites, anthracites, and bituminous coals are illustrative of some of these types, though it is understood that other coals which are not specifically categorized within these groupings are also contemplated by this invention.

The flocculating agents for use herein are sodium starch xanthate and other water-soluble salts thereof, such as potassium starch xanthate. The preferred degree of substitution (D.S.) of these xanthates ranges from about 0.05 to about 0.40. Higher D.S.'s may also be used but with little added effect. These compounds are characterized by a water solubility of at least about 99%; that is, substantially all of the agent will dissolve in an excess of cold water. An effective amount of the flocculant for secondary coal recovery is defined as that amount which is required to render the coal-depleted aqueous phase at least fairly clear, as described below in the examples. This amount will vary with the type of coal and the initial slurry concentration but will typically be in the range of 2.5 to 8.5 p.p.m. (w/v) based on the total coal suspension.

The flocculant is most beneficially added as a dilution of a stock solution having a starch xanthate concentration up to about 13% (w/v) beyond which the solution viscosity becomes unworkably thick. The pH of these solutions is approximately 11, while that of the coal suspensions to be treated may range up to about 7.5 to 8.5. However, the relatively small proportion of flocculant solution added to the slurry has substantially no effect on the pH, and no further pH adjustment is necessary. Other than the above-described conditions, the mechanical details of xanthate addition are outside the scope of the invention, and it is envisioned that any conventional mixing procedure may be employed. The time to effect completion of the flocculation will of course depend upon the procedure used, the type and concentration of the powdered coal, and the amount of starch xanthate added, but will normally range from a few minutes to several hours. The coal-enriched sediment phase so produced is readily separable from the coal-depleted aqueous phase. In one method of recovery the coal is allowed to settle in a compact lower layer from which the clear supernatant can be decanted. Alternatively, the coal can be recovered by either filtration or centrifugation.

While the advantages of this discovery are realized by the use of a water-soluble starch xanthate as the sole flocculant, it is within the scope of the invention to employ auxiliary clarification aids, which do not themselves possess flocculation properties. For many of the coals, there is a tendency for a floating layer of particles to form on the surface of the supernatant. This appears to be the result of entrainment by oil substances inherent to various coals. Accordingly, it is often desirable to treat the suspension simply by incorporating an organic solvent, such as ethanol or acetone in an amount up to 2% (v/v), in order to disperse the oils, and thereby inhibit the formation of the floating layer.

The following examples are intended only to further illustrate the invention and are not intended to limit the scope of the invention which is defined by the claims.

EXAMPLES 1–9

A. Starch xanthates ranging in D.S. from 0.07 to 0.36 were prepared from commercial pearl corn starch by the method described in Swanson et al., Ind. Eng. Chem., Prod. Res. Dev. 3: 22 (1964) and Doane et al., Staerke 17: 77 (1965). These were stored under refrigeration as sodium salt stock solutions at concentrations of 8–13% (w/v) and at pH 11. From the stock solutions, the following flocculant solutions were prepared:

| D.S. | Concentration (g. NaSX/ml.) |
|---|---|
| 0.07 | $0.8468 \times 10^{-4}$ |
| 0.13 | $0.7968 \times 10^{-4}$ |
| 0.18 | $0.8072 \times 10^{-4}$ |
| 0.36 | $0.7620 \times 10^{-4}$ |

B. Test slurries of pulverized coal were prepared by slowly pouring a 2.0-g. sample into a 100-ml. graduated glass cylinder containing 80 ml. of tap water. Each cylinder was closed and then inverted and reverted five times. Slurries were prepared from the following coal samples:

| Example | Coal type | Description |
|---|---|---|
| 1 | PA anthracite | PSOC 85; Leader Seam, Pennsylvania; 100 mesh |
| 2 | ND lignite | PSOC 86; Zap Seam, North Dakota; 43% passes 60 mesh |
| 3 | PA bituminous A | PSOC 102; Pittsburg Seam, Pennsylvania; high volatile; 100 mesh |
| 4 | KY bituminous A | PSOC 5; Elkhorn Seam #3, Kentucky; high volatile; 100 mesh |
| 5 | IN bituminous B | PSOC 105 & 106; Black Seam #1, Indiana; high volatile; 20% passes 60 mesh |
| 6 | CO bituminous C | PSOC 233; Wage Seam, Colorado; high volatile; 100 mesh |
| 7 | PA bituminous | Elliot; Brookville Seam, Pennsylvania; medium volatile; 100 mesh |
| 8 | Can. sub-bituminous | Composite; Wales Seam, Canada; gray color; 100 mesh |
| 9 | IL soft coal | strip mine; Illinois; brown color; 60 mesh |

C. To each of the test slurries prepared in section (B), the appropriate amounts of one of the starch xanthate solutions prepared in section (A) and water to bring total volume to 100 ml. were immediately added to yield the desired level of flocculant. The cylinder was closed and then inverted and reverted five times. The time to reach supernatant clarity, the settled sediment volume at clarity, the settled sediment volume at 0.5 hr., the supernatant character, and the presence of a floating layer were observed, and are reported in the Table below.

The term "clarity" as used in the Table is defined to mean that an ordinary typed word on white paper held against the glass cylinder at the midpoint of the cylinder (that is, the 50-ml. line), is readable through the supernatant from the other side. The supernatant character, as also observed at the cylinder midpoint, is rated as follows:

turbid: opaque to translucent from suspended particles fairly clear: some suspended particles and discoloration, but clarity is distinct very clear: only a few particles in suspension with slight coloration The floating particles are described as follows:

layer (— ml.): floating particles completely cover the supernatant surface to the indicated depth ring: a central portion of the supernatant surface is free of floating particles miniscus ring: floating particles exist only at the supernatant-cylinder wall interface few: a few particles dispersed on the supernatant surface but forming neither a distinct layer nor a ring none: no floating particles Though the results reported for Examples 6 and 8 indicate no improvement of the NaSX-treated suspensions over the controls, it is expected that the 0.5-hr. time period allotted for flocculation was insufficient and an extended settling period is required for there to be a noticeable effect with these coals. With other coals, such as those in Examples 7A, 7B, and 9D, a high degree of supernatant clarity may occur within an acceptably short time period but then diminish before the 0.5-hr. reading due to leaching of strongly colored substances from the coal sediment layer.

It is understood that the foregoing detailed description is given merely by way of illustration and that modification and variations may be made therein without departing from the spirit and scope of the invention.

TABLE

| Example | NaSX level (p.p.m.) | NaSX D.S. | Time to reach supernatant clarity[a] (min.) | Settled sediment volume at clarity [a,b] (ml.) | Settled sediment volume at 0.5 hr. (ml.) | Supernatant character[a] at 0.5 hr. | Floating particles at 0.5 hr. |
|---|---|---|---|---|---|---|---|
| 1 Control A | 0.00 | — | did not | — | 4 | turbid | layer (1 ml.) |
| 1 Control B | 0.00 | — | did not | — | 4 | turbid | layer (0.5 ml.) |
| 1 A | 4.24 | 0.36 | 20 | 5 | 5 | very clear | ring (1 ml.) |
| 1 B | 4.24 | 0.36 | <5 | 7 | 7 | very clear | miniscus ring |
| 2 Control A | 0.00 | — | 25 | 5 | 5 | fairly clear | ring (1 ml.) |
| 2 A | 4.24 | 0.36 | 15 | 5 | 5 | very clear | few |
| 2 B | 4.24 | 0.36 | 5 | 6 | 6 | very clear | ring (0.5 ml.) |
| 3 Control A | 0.00 | — | did not | — | 4 | turbid | layer (3 ml.) |
| 3 Control B | 0.00 | — | did not | — | 4 | turbid | layer (2 ml.) |
| 3 A | 4.24 | 0.36 | <5 | 6 | 6 | very clear | layer (3 ml.) |
| 3 B | 4.24 | 0.36 | <5 | 8 | 8 | very clear | ring (1 ml.) |
| 4 Control A | 0.00 | — | did not | — | 3 | turbid | layer (5 ml.) |
| 4 Control B | 0.00 | — | 20 | 4 | 4 | fairly clear | layer (4 ml.) |
| 4 A | 4.24 | 0.36 | <5 | 6 | 6 | very clear | layer (5 ml.) |
| 4 B | 4.24 | 0.36 | <5 | 7 | 7 | very clear | layer (4 ml.) |

TABLE-continued

| Example | NaSX level (p.p.m.) | NaSX D.S. | Time to reach supernatant clarity$^a$ (min.) | Settled sediment volume at clarity$^{a,b}$ (ml.) | Settled sediment volume at 0.5 hr. (ml.) | Supernatant character$^a$ at 0.5 hr. | Floating particles at 0.5 hr. |
|---|---|---|---|---|---|---|---|
| 5 Control A | 0.00 | — | did not | — | 5 | turbid | few |
| 5 A | 4.24 | 0.36 | 20 | 4 | 4 | very clear | none |
| 5 B | 4.24 | 0.36 | <5 | 5 | 5 | very clear | miniscus ring |
| 6 Control A | 0.00 | — | did not | — | 4 | turbid | ring (1 ml.) |
| 6 Control B | 0.00 | — | 30 | — | 4 | fairly clear | layer (0.5 ml.) |
| 6 A | 4.24 | 0.36 | did not | — | 4 | turbid | ring (1 ml.) |
| 6 B | 4.24 | 0.36 | did not | — | 4 | turbid | ring (1 ml.) |
| 7 Control A | 0.00 | — | did not | — | 3 | turbid | layer (5 ml.) |
| 7 Control B | 0.00 | — | did not | — | 3 | turbid | layer (5 ml.) |
| 7 A | 4.24 | 0.36 | <5 | 5 | 5 | turbid$^c$ | layer (5 ml.) |
| 7 B | 4.24 | 0.36 | 10 | 4 | 4 | turbid$^c$ | layer (5 ml.) |
| 8 Control A | 0.00 | — | did not | — | 8 | turbid | few |
| 8 A | 4.24 | 0.36 | did not | — | 8 | turbid | none |
| 8 B | 4.24 | 0.36 | did not | — | 9 | turbid | none |
| 9 Control A | 0.00 | — | did not | — | 5 | turbid | ring (0.5 ml.) |
| 9 Control B | 0.00 | — | did not | — | 4 | turbid | ring (0.5 ml.) |
| 9 A | 8.47 | 0.07 | <5 | 10 | 8 | very clear | layer (1 ml.) |
| 9 B | 7.97 | 0.13 | <5 | 10 | 9 | very clear | layer (1 ml.) |
| 9 C | 8.07 | 0.18 | <5 | 10 | 9 | very clear | layer (1 ml.) |
| 9 D | 4.24 | 0.36 | 5 | 12 | 10 | turbid$^c$ | ring (0.5 ml.) |
| 9 E | 4.24 | 0.36 | did not | — | 10 | turbid | ring (0.5 ml.) |
| 9 F | 7.62 | 0.36 | <5 | 10 | 9 | very clear | layer (1 ml.) |

$^a$As observed at the 50-ml. mark.
$^b$Where the time to reach supernatant clarity was <5·min., the reported sediment volume is at 5 min.
$^c$Turbidity is attributed to leaching of discoloring material from sediment layer after attainment of supernatant clarity.

I claim:

1. A method for flocculating coal from aqueous suspension with a water-soluble starch xanthate as the sole flocculant comprising the following steps:
   a. adding to said coal suspension an effective amount of said water-soluble starch xanthate flocculant;
   b. mixing said coal suspension containing said flocculant;
   c. allowing said coal to flocculate from said suspension thereby forming a coal-enriched sediment phase and a coal-depleted aqueous phase wherein said phases are readily separable from one another; and
   d. recovering said sediment phase from said aqueous phase.

2. The method as described in claim 1 wherein said water-soluble starch xanthate is sodium starch xanthate.

3. The method as described in claim 1 wherein the flocculation in step (c) is conducted at a pH substantially the same as that attributed by said coal.

4. The method as described in claim 1 wherein said coal-enriched sediment phase is recovered in step (d) by allowing said sediment phase to settle, thereby forming a lower sediment layer comprising said sediment phase and an upper supernatant layer comprising said aqueous phase, and decanting said supernatant layer from said sediment layer.

5. The method as described in claim 1 wherein said coal-enriched sediment phase is recovered in step (d) by filtration.

6. The method as described in claim 1 wherein said coal-enriched sediment phase is recovered in step (d) by centrifugation.

* * * * *